United States Patent
Yeh

(10) Patent No.: US 9,651,827 B2
(45) Date of Patent: May 16, 2017

(54) DISPLAY DEVICE

(71) Applicant: AU Optronics Corp., Hsin-Chu (TW)

(72) Inventor: Ta-Wei Yeh, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 293 days.

(21) Appl. No.: 14/178,307

(22) Filed: Feb. 12, 2014

(65) Prior Publication Data

US 2014/0340619 A1 Nov. 20, 2014

(30) Foreign Application Priority Data

May 14, 2013 (TW) .............................. 102117057 A

(51) Int. Cl.
*G02F 1/13363* (2006.01)

(52) U.S. Cl.
CPC ............. *G02F 1/133634* (2013.01); *G02F 2001/133637* (2013.01); *G02F 2413/02* (2013.01); *G02F 2413/04* (2013.01); *G02F 2413/06* (2013.01); *G02F 2413/12* (2013.01)

(58) Field of Classification Search
CPC .................................................. G02F 1/13363
See application file for complete search history.

(56) References Cited

U.S. PATENT DOCUMENTS

| 7,169,447 B2 | 1/2007 | Su Yu |
| 2004/0001255 A1 | 1/2004 | Fratello |
| 2006/0028601 A1 | 2/2006 | Kawahara |
| 2006/0055854 A1 | 3/2006 | Yu |
| 2006/0221283 A1* | 10/2006 | Nakao et al. ................. 349/117 |
| 2007/0236629 A1 | 10/2007 | Wu |
| 2009/0128759 A1 | 5/2009 | Yoshimi |
| 2009/0161045 A1* | 6/2009 | Kawamoto .......... G02B 5/3033 349/98 |

(Continued)

FOREIGN PATENT DOCUMENTS

| CN | 101441378 A | 5/2009 |
| TW | 200305756 | 11/2003 |

(Continued)

*Primary Examiner* — Nathanael R Briggs
*Assistant Examiner* — Alexander Gross
(74) *Attorney, Agent, or Firm* — WPAT, PC; Justin King; Douglas Hosack

(57) ABSTRACT

A display device including a display panel, a first polarizer, a second polarizer, a first phase compensation film, and a second phase compensation film is provided. The first polarizer and the second polarizer are disposed on two sides of the display panel. The first polarizer has a first light-absorption axis, and the second polarizer has a second light-absorption axis. The first phase compensation film and the second phase compensation film are disposed between the first polarizer and the second polarizer. The second phase compensation film obeys a first formula:

$$\frac{R\lambda 1}{\lambda 1} > \frac{R\lambda 2}{\lambda 2} > \frac{R\lambda 3}{\lambda 3},$$

wherein $R\lambda 1$, $R\lambda 2$ and $R\lambda 3$ are horizontal phase retardation values of the second phase compensation film when wavelengths of lights passing through the second phase compensation film are respectively $\lambda 1$, $\lambda 2$ and $\lambda 3$, and $\lambda 1 < \lambda 2 < \lambda 3$.

10 Claims, 13 Drawing Sheets

(56) References Cited

U.S. PATENT DOCUMENTS

2010/0045910 A1 2/2010 Bitou
2010/0053521 A1* 3/2010 Do et al. .................. 349/119

FOREIGN PATENT DOCUMENTS

| TW | 200517723 | 6/2005 |
|----|-----------|--------|
| TW | I275877 | 3/2007 |
| TW | I276850 | 3/2007 |
| TW | I372891 | 9/2012 |
| TW | I373638 | 10/2012 |

\* cited by examiner

DISPLAY DEVICE

BACKGROUND OF THE DISCLOSURE

1. Field of the Disclosure

The document relates to a display device, and more particularly, to a display device including a phase compensation film with positive wavelength dispersion.

2. Description of the Prior Art

Liquid crystal displays have advantages of light weight, thin thickness, low power consumption, and low radiation; therefore, the liquid crystal displays have replaced traditional cathode ray tube (CRT) displays of laptop computers to be widely applied to many kinds of portable electronic products in the market, such as notebooks and personal digital assistants (PDA).

A traditional vertical alignment liquid crystal display typically includes a top polarizer, a bottom polarizer, a top substrate, a bottom substrate, and a liquid crystal layer disposed between the top substrate and the bottom substrate. The top polarizer and the bottom polarizer are disposed at the outside of the top substrate and the outside of the bottom substrate respectively, and an absorption axis of the top polarizer and an absorption axis of the bottom polarizer are perpendicular to each other. When the vertical alignment liquid crystal display is a normally black mode liquid crystal display, and there is no voltage difference provided between the top substrate and the bottom substrate, the liquid crystal molecules of the liquid crystal layer do not provide different phase retardation values. Accordingly, light passing through the bottom polarizer have the same polarizing direction as the light passing through the liquid crystal layer, and the display is in a dark state. When a voltage difference is applied between the top substrate and the top substrate, the liquid crystal layer produces a half wave phase retardation, so that the polarizing direction of the light passing through the bottom polarizer is perpendicular to the absorption axis of the top polarizer because of the half wave phase retardation, and the display is in a bright state.

However, the liquid crystal molecules closer to the top substrate and the bottom substrate have larger anchoring force on the top substrate and the bottom substrate because of the rubbings of the surfaces of the top substrate and the bottom substrate. That is the top substrate and the bottom substrate may include alignment films having rubbing directions on the inner surfaces thereof. Accordingly, even in a condition of applying no voltage difference, the liquid crystal molecules closer to the surfaces of the top substrate and the bottom substrate still lie down and do not stand up. For this reason, the liquid crystal molecules lying down closer to the top substrate and the bottom substrate will affect the phase retardation value of the polarized light passing therethrough, and an observer seeing the display in a direction of a large viewing angle will see light leakage when the display is in the dark state. Also, the absorption axis of the top polarizer and the absorption axis of the bottom polarizer are not perpendicular to each other in the direction of the large viewing angle, so that the observer easily sees the light leakage, and the contrast ratio of the liquid crystal display is also affected. Furthermore, when the liquid crystal molecules are perpendicular to the top substrate or the bottom substrate, the liquid crystal molecules do not provide only one refractive index, and provides uneven refractive indexes. Since that, the light passing through the liquid crystal molecules along the direction of the large viewing angle have different phase retardation values, and the light leakage is easily generated.

Although the contrast ratio of the liquid crystal display has been improved by the phase compensation film disposed at the outside of the top substrate or the bottom substrate, the phase compensation film composed of single one material only can compensate the phase difference of the light with one wavelength. For example, when a short wavelength is 450 nm, and a long wavelength is 730 nm, the light leakage is still generated.

Besides, since the light with a shorter wavelength has larger phase retardation values while passing through the liquid crystal molecules, the material of the phase compensation film adapted to compensate the liquid crystal display generally is designed to have negative wavelength dispersion. That is to say that the light with the shorter wavelength has a smaller phase retardation values while passing through the phase compensation film with negative wavelength dispersion, so that the phase retardation values generated from the liquid crystal molecules can be compensated. However, the material with negative wavelength dispersion is not easy to be designed, and it is quite complex to manufacture this kind of material. Thus, it is not easy to use the present phase compensation film with negative wavelength dispersion to compensate the phase retardation values in all visible wavelengths, and the cost for manufacturing the liquid crystal display is easily increased largely.

Therefore, to provide a new liquid crystal display to reduce the light leakage in the direction of the large viewing angle is an objective in this field.

SUMMARY OF THE DISCLOSURE

In one aspect, a display is provided to reduce the light leakage in the direction of the large viewing angle.

A display device is provided according to an exemplary embodiment. The display device comprises a display panel, a first polarizer, a second polarizer, a first phase compensation film, and a second phase compensation film. The display panel comprises a light-incident surface and a light-emitting surface. The first polarizer is disposed on the light-incident surface of the display panel, and the first polarizer comprises a first light-absorption axis. The second polarizer is disposed on the light-emitting surface of the display panel, and the second polarizer comprises a second light-absorption axis. The first phase compensation film is disposed between the first polarizer and the second polarizer. The second phase compensation film is disposed between the first polarizer and the second polarizer, and the second phase compensation film obeys a first formula:

$$\frac{R\lambda 1}{\lambda 1} > \frac{R\lambda 2}{\lambda 2} > \frac{R\lambda 3}{\lambda 3},$$

wherein $R\lambda 1$, $R\lambda 2$ and $R\lambda 3$ respectively are horizontal phase retardation values of the second phase compensation film when wavelengths of lights passing through the second phase compensation film are respectively $\lambda 1$, $\lambda 2$ and $\lambda 3$, and $\lambda 1 < \lambda 2 < \lambda 3$.

The display of the invention combines the second phase compensation film that obeys the first formula:

$$\frac{R\lambda 1}{\lambda 1} > \frac{R\lambda 2}{\lambda 2} > \frac{R\lambda 3}{\lambda 3}$$

with the first phase compensation film to effectively compensate the phase retardation values of the lights with different wavelengths in the direction of the large viewing angle, so that the light leakage of the display in the direction of the large viewing angle can be effectively solved.

These and other aspects of the present invention will no doubt become obvious to those of ordinary skill in the art after reading the following detailed description of the preferred embodiment that is illustrated in the various figures and drawings.

DETAILED DESCRIPTION

To provide a better understanding of the invention, exemplary embodiments will be detailed as follows. The exemplary embodiments of the invention are illustrated in the accompanying drawings with numbered elements to elaborate the contents and effects to be achieved.

Figure 1:
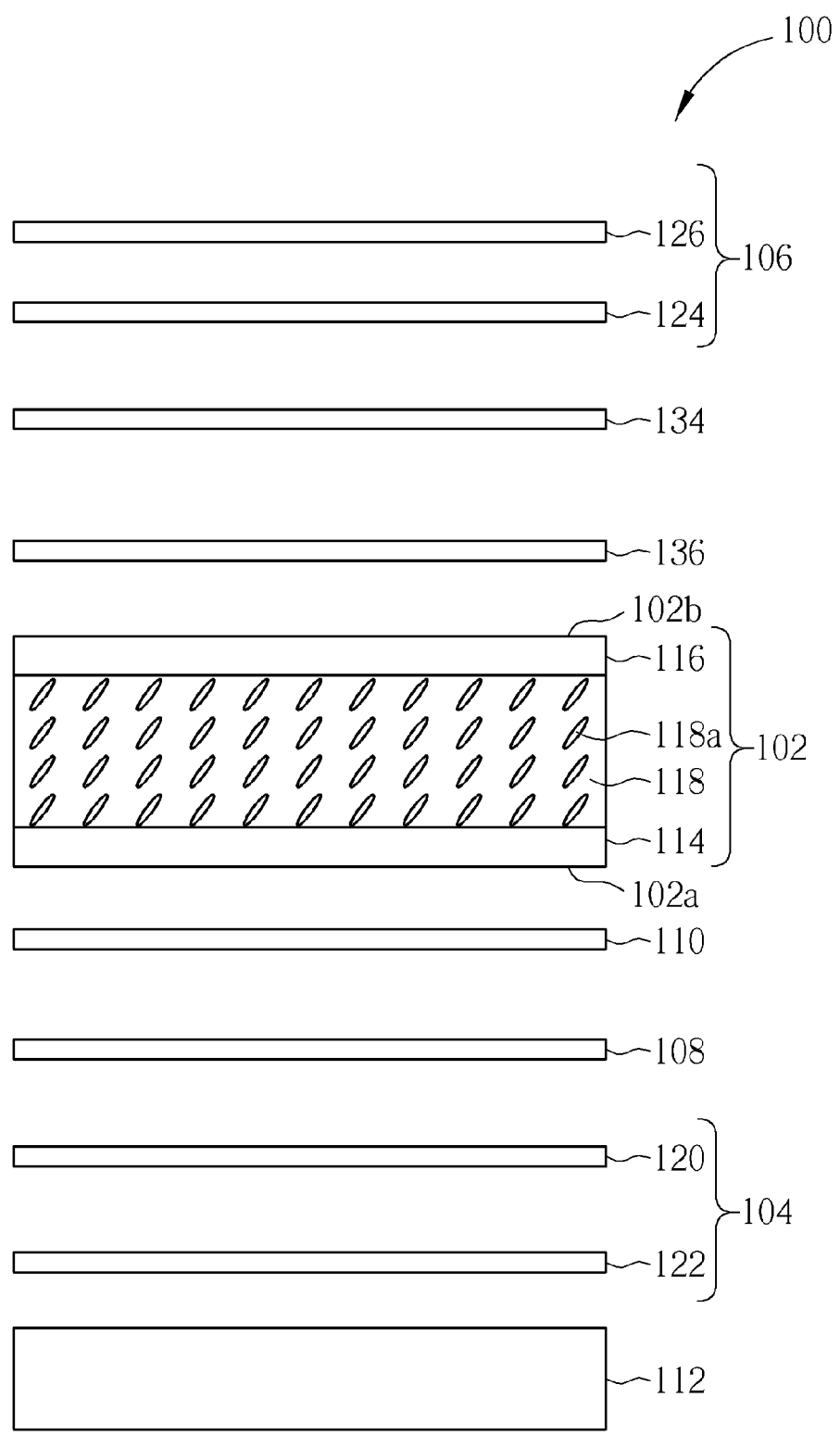
FIG. 1 and FIG. 2 are schematic diagrams illustrating a display according to a first exemplary embodiment.
Figure 2:
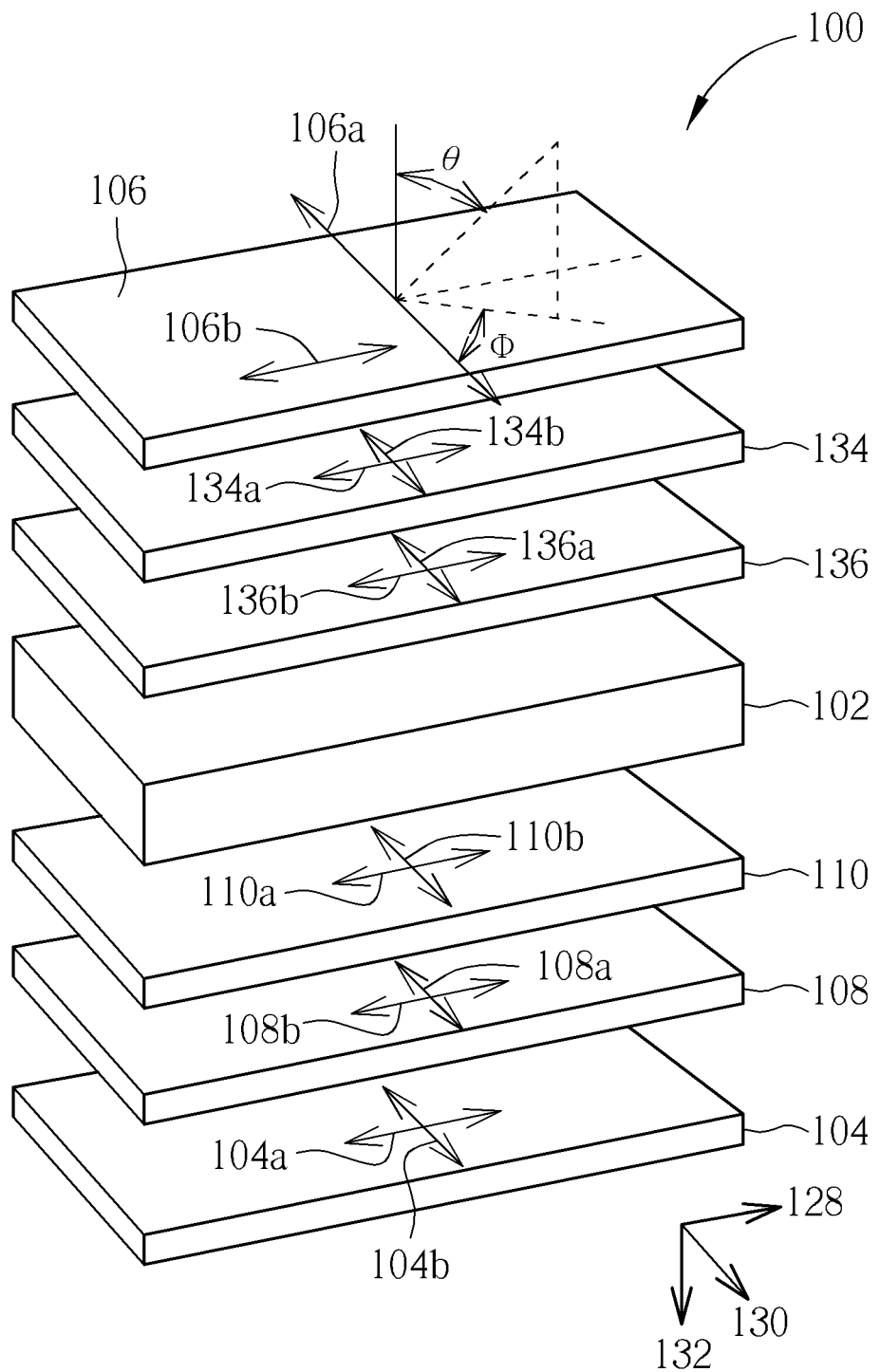

Please refer to FIG. 1 and FIG. 2, which are schematic diagrams illustrating a display according to a first exemplary embodiment, wherein FIG. 2 is a schematic diagram illustrating a relationship between slow axes and absorption axes of films according to the first exemplary embodiment. As shown in FIG. 1, the display 100 of this embodiment includes a display panel 102, a first polarizer 104, a second polarizer 106, a first phase compensation film 108, and a second phase compensation film 110. In this embodiment, the display panel 102 may be, for example, a liquid crystal display panel, but the invention is not limited herein. When the display panel 102 is the liquid crystal display panel, the display 100 is a liquid crystal display, and further includes a backlight module 112. The invention is not limited to this. The following description takes the display panel 102 to be the liquid crystal display panel as an example, but the invention is not limited herein. The display panel 102 may include a thin-film transistor substrate 114, a color filter substrate 116, and a liquid crystal layer 118. The liquid crystal layer 118 is disposed between the thin film transistor substrate 114 and the color filter substrate 116, and includes a plurality of liquid crystal molecules 118a disposed between the thin film transistor substrate 114 and the color filter substrate 116. Preferably, the liquid crystal layer 118 may be a vertically aligned liquid crystal layer, and the liquid crystal molecules 118a may be a uniaxial crystal material. For example, when no voltage difference is applied between the thin-film transistor substrate 114 and the color filter substrate 116, the liquid crystal molecules 118a of the vertical aligned liquid crystal layer 118 are affected by bumps, protrusions or alignment films of the color filter substrate 116 and the thin-film transistor film 114 to have a pre-tilt angle close to 90 degrees, so that the vertical aligned liquid crystal layer 118 doesn't have phase retardation in a vertical direction, but the invention is not limited to this. The liquid crystal molecules 118a also can use other methods to have vertical alignment. A side of the thin-film transistor substrate 114 facing the backlight module 116, which is an outer surface of the thin-film transistor substrate 114, is a light-incident surface 102a, and a side of the color filter substrate 116 opposite to the thin-film transistor substrate 114, which is an outer surface of the color filter substrate 116, is a light-emitting surface. The first polarizer 104 is disposed on the light-incident surface 102a of the display panel 102, and the second polarizer 106 is disposed on the light-emitting surface 102b. The first phase compensation film 108 and the second phase compensation film 110 are disposed between the first polarizer 104 and the second polarizer 106. In this embodiment, the first phase compensation film 108 and the second phase compensation film 110 are disposed between the first polarizer 104 and the display panel 102, and the second phase compensation film 110 is disposed between the first phase compensation film 108 and the display panel 102, but the invention is not limited to this.

In this embodiment, the first polarizer 104 may include a first polarizing layer 120 and a protection film 122, and the first polarizing layer 120 is disposed between the first protection film 122 and the light-incident surface 102a of the display panel 10. The first polarizing layer 120 is adapted to polarize light passing through the first polarizing layer 120, and a material of the first polarizing layer 120 may include, for example, polyvinyl alcohol (PVA), but the invention is not limited herein. The first protection film 122 is used to protect the first polarizing layer 120, and a material of the first protection film 122 include, for example, triacetyl cellulose (TAC), but the invention is not limited herein. The second polarizer 106 may include a second polarizing layer 124 and a second protection film 126, and the second polarizing layer 124 is disposed between the second protection film 126 and the light-emitting surface 102b of the display panel 102. The second polarizing layer 124 is adapted to polarize light passing through the second polarizing layer 124, and a material of the second polarizing layer 124 may include, for example, PVA, but the invention is not limited herein. The second protection film 126 is used to protect the second polarizing layer 124, and a material of the second protection film 126 include, for example, triacetyl cellulose (TAC), but the invention is not limited herein.

As shown in FIG. 2, the first polarizer 104 has a first light-absorption axis 104a disposed along a first direction 128. Light with a polarizing direction substantially parallel to the first light-absorption axis 104a cannot pass through the first polarizer 104, and the first polarizer 104 allows light with a first linear polarizing direction 104b substantially perpendicular to the first light-absorption axis 104a to pass through itself. The second polarizer 106 has a second light-absorption axis 106a disposed along a second direction 130. The second polarizer 106 allows light with a second linear polarizing direction 106b substantially perpendicular to the second light-absorption axis 106a to pass through itself. In this embodiment, the first direction 128 is substantially perpendicular to the second direction 130, and the first direction 128 and the second direction 130 are substantially parallel to the light-incident surface 102a or the light-emitting surface 102b, so that the first light-absorption axis 104a is substantially perpendicular to the second light-absorption axis 106a, and the display 100 is a normally black mode liquid crystal display. The invention is not limited to this, and the first light-absorption axis and the second light-absorption axis of the invention also can be substantially parallel to each other, so that the display can be a normally white mode liquid crystal display. Furthermore, in the invention, the viewing angle θ, which is a tilt angle, is defined as an included angle formed between a viewing direction and a normal direction of the display 100, and the azimuth angle ψ is defined as an included angle formed between a direction of the viewing direction projected onto the surface of the display 100 and a side of the display 100.

Besides, the first phase compensation film 108 is a biaxial film. Accordingly, the refractive index of the first phase compensation film 108 in the first direction 128, the refractive index of the first phase compensation film 108 in the second direction 130 and the refractive index of the first phase compensation film 108 in a third direction 132 substantially perpendicular to the first direction 128 and the second direction 130 are different, and the first phase compensation film 108 has a first slow axis 108a and a first fast axis 108b. The first slow axis 108a and the first fast axis 108b are substantially perpendicular to each other, and are substantially parallel to a plane of the light-incident surface 102a. The slow axis is defined as a pre-determined axis of the phase compensation film with a largest refractive index, and the fast axis is defined as another pre-determined axis of the phase compensation film with a smallest refractive index. The second phase compensation film 110 is also a biaxial film. Accordingly, the refractive index of the second phase compensation film 110 in the first direction 128, the refractive index of the second phase compensation film 110 in the second direction 130 and the refractive index of the second phase compensation film 110 in the third direction 132 substantially perpendicular to the first direction 128 and the second direction 130 are different, and the second phase compensation film 110 has a second slow axis 110a and a second fast axis 110b. The second slow axis 110a and the second fast axis 110b are substantially perpendicular to each other, and are substantially parallel to the plane of the light-incident surface 102a. In this embodiment, the first slow axis 108a is disposed along the second direction 130, and is substantially perpendicular to the first light-absorption axis 104a. The second slow axis 110b is disposed along the first direction 128, and is substantially parallel to the first light-absorption axis 104a.

In this embodiment, the display 100 may further include a third phase compensation film 134 and the fourth phase compensation film 136 disposed between the second polarizer 106 and the display panel 102, and the fourth phase compensation film 136 is disposed between the third phase compensation film 134 and the display panel 102. The third phase compensation film 134 may be constituted by a material substantially the same as the first phase compensation film 108 so as to have substantially the same relationship between the horizontal phase retardation value and the wavelength. The fourth phase compensation film 136 may be constituted by a material substantially the same as the second phase compensation film 110 so as to have substantially the same relationship between the horizontal phase retardation value and the wavelength. For example, the third phase compensation film 134 and the fourth phase compensation film 136 are also biaxial films. Accordingly, the refractive index of the third phase compensation film 134 in the first direction 128, the refractive index of the third phase compensation film 134 in the second direction 130 and the refractive index of the third phase compensation film 134 in the third direction 132 are different, and the refractive index of the fourth phase compensation film 136 in the first direction 128, the refractive index of the fourth phase compensation film 136 in the second direction 130 and the refractive index of the fourth phase compensation film 136 in the third direction 132 are different. The third phase compensation film 134 has a third slow axis 134a and a third fast axis 134b. The third slow axis 134a and the third fast axis 134b are substantially perpendicular to each other, and are substantially parallel to the plane of the light-incident surface 102a. The fourth phase compensation film 136 has a fourth slow axis 136a and a fourth fast axis 136b. The fourth slow axis 136a and the fourth fast axis 136b are substantially perpendicular to each other, and are substantially parallel to the plane of the light-incident surface 102a. In this embodiment, the third slow axis 134a is disposed along the first direction 128, and is substantially perpendicular to the second light-absorption axis 106b. The fourth slow axis 136a is disposed along the second direction 130, and is substantially parallel to the second light-absorption axis 106b.

The second phase compensation film 110 obeys a first formula:

$$\frac{R\lambda 1}{\lambda 1} > \frac{R\lambda 2}{\lambda 2} > \frac{R\lambda 3}{\lambda 3},$$

so that the first phase compensation film 108 combined with the second phase compensation film 110 can compensate the phase retardation values generated from the liquid crystal layer 118, the first polarizer 104 and the second polarizer 106 in the direction of the large viewing angle θ, wherein $R\lambda 1$, $R\lambda 2$ and $R\lambda 3$ are respectively horizontal phase retardation values of the second phase compensation film 110 when the wavelengths of the lights passing through the second phase compensation film 110 are respectively $\lambda 1$, $\lambda 2$ and $\lambda 3$, and $\lambda 1 < \lambda 2 < \lambda 3$. For example, the large viewing angle θ may be substantially 60 degrees or 70 degrees. The horizontal phase retardation value is defined as a product of a difference between the refractive index $n_x$ and the refractive index $n_y$ of each phase compensation film respectively in the slow axis and in the fast axis and a thickness d of each phase compensation film in the third direction 132, and can be represented as $(n_x - n_y) \times d$. Furthermore, the first phase compensation film 108 may obey a second formula:

$$\frac{R\lambda 1'}{R\lambda 2'} \cong 1 \cong \frac{R\lambda 3'}{R\lambda 2'},$$

where $R\lambda 1'$, $R\lambda 2'$ and $R\lambda 3'$ are respectively horizontal phase retardation values of the first phase compensation film 108 when the wavelengths of the lights passing through the first phase compensation film 108 are respectively $\lambda 1$, $\lambda 2$ and $\lambda 3$ and $\lambda 1 < \lambda 2 < \lambda 3$. In this embodiment, the wavelengths $\lambda 1$, $\lambda 2$ and $\lambda 3$ are 440 nm, 550 nm and 650 nm, respectively, but the invention is not limited to this. The first phase compensation film 108 may include a polymer material, such as cyclo olefin polymer (COP), but is not limited herein. Also, the fourth phase compensation film 136 may obey a third formula:

$$\frac{R\lambda 4}{\lambda 4} > \frac{R\lambda 5}{\lambda 5} > \frac{R\lambda 6}{\lambda 6},$$

wherein $R\lambda 4$, $R\lambda 5$ and $R\lambda 5$ are respectively horizontal phase retardation values of the second phase compensation film 136 when the wavelengths of the lights passing through the second phase compensation film 136 are respectively $\lambda 4$, $\lambda 5$ and $\lambda 6$, and $\lambda 1 < \lambda 2 < \lambda 3$. The third phase compensation film 134 may obey a fourth formula:

$$\frac{R\lambda 4'}{R\lambda 5'} \cong 1 \cong \frac{R\lambda 6'}{R\lambda 5'},$$

where $R\lambda 4'$, $R\lambda$, $5'$ and $R\lambda$, $6'$ are respectively horizontal phase retardation values of the third phase compensation film 134 when the wavelengths of the lights passing through the third phase compensation film 134 are respectively $\lambda 4$, $\lambda 5$ and $\lambda 6$. In this embodiment, the third phase compensation film 134 may include a polymer material, such as cyclo olefin polymer (COP), but is not limited herein. The wavelengths $\lambda 4$, $\lambda 5$ and $\lambda 6$ also may be 440 nm, 550 nm and 650 nm, respectively in this embodiment, but the invention is not limited to this. For example, when the wavelength of the light is 440 nm, the horizontal phase retardation values and the vertical phase retardation values of the second phase compensation film 110 and the fourth phase compensation film 136 may be 19.5 nm and 33.15 nm respectively. When the wavelength of the light is 550 nm, the horizontal phase retardation values and the vertical phase retardation values of the second phase compensation film 110 and the fourth phase compensation film 136 may be 10.6 nm and 18.2 nm respectively, and the horizontal phase retardation values and the vertical phase retardation values of the first phase compensation film 108 and the third phase compensation film 134 may be 73.3 nm and 124.61 nm respectively. When the wavelength of the light is 650 nm, the horizontal phase retardation values and the vertical phase retardation values of the second phase compensation film 110 and the fourth phase compensation film 136 may be 3.3 nm and 5.69 nm respectively. The vertical phase retardation value may be represented as $$\left[\frac{(n_x + n_y)}{2} - n_z\right] \times d,$$

wherein $n_z$ is a refractive index of the phase compensation film in the third direction 132, which is the refractive index in a direction of thickness, but the invention is not limited to this.

Figure 3:
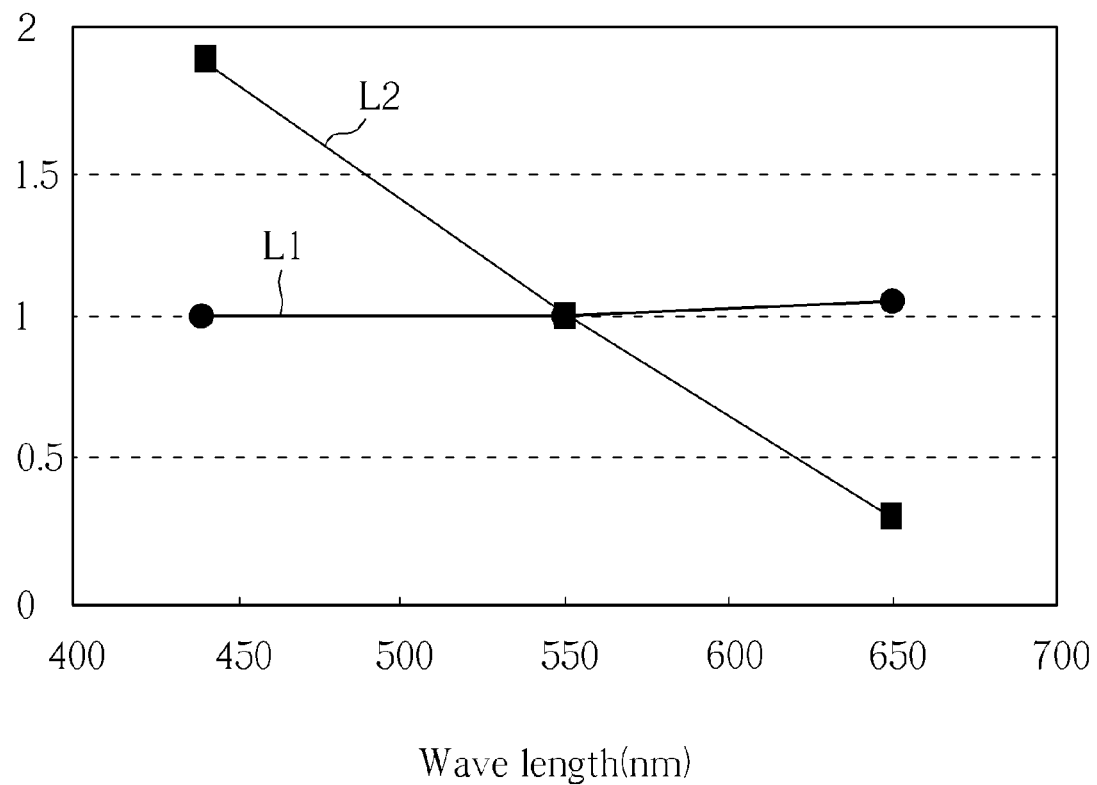
FIG. 3 is a schematic diagram illustrating the relationship between normalized horizontal phase retardation values of the first phase compensation film and the second phase compensation film and the wavelength.

In this embodiment, the first phase compensation film 108 and the third phase compensation film 134 are substantially composed of the same material, and the second phase compensation film 110 and the fourth phase compensation film 136 are substantially composed of the same material, so the following description take the first phase compensation film 108 and the second phase compensation film 110 as an example to describe their characteristics. In other embodiments, the first phase compensation film and the third phase compensation film may be composed of different materials, and the second phase compensation film and the fourth phase compensation film may be composed of different materials. Please refer to FIG. 3, which is a schematic diagram illustrating the relationship between normalized horizontal phase retardation values of the first phase compensation film 108 and the second phase compensation film 110 and the wavelength, wherein the normalized horizontal phase retardation value is produced by the horizontal phase retardation value in any wavelength divided by the horizontal phase retardation value in the wavelength of 550 nm. Accordingly, the normalized horizontal phase retardation values shown in this diagram and in the following diagrams have no unit. As shown in FIG. 3, a relationship line L1 represents the relationship between the normalized horizontal phase retardation value of the first phase compensation film 108 and the wavelength of the light, which is the second formula:

$$\frac{R\lambda 1'}{R\lambda 2'} \cong 1 \cong \frac{R\lambda 3'}{R\lambda 2'}.$$

The relationship line L2 represents the relationship between the normalized horizontal phase retardation value of the second phase compensation film 110 and the wavelength of the light, which is the first formula:

$$\frac{R\lambda 1}{\lambda 1} > \frac{R\lambda 2}{\lambda 2} > \frac{R\lambda 3}{\lambda 3}.$$

As we can see from the above-mentioned description, for the light with the wavelength smaller than 550 nm, the second phase compensation film 110 has larger horizontal phase retardation value than the first phase compensation film 108, and for the light with the wavelength larger than 550 nm, the second phase compensation film 110 has smaller horizontal phase retardation value than the first phase compensation film 108. That is to say that the decrease of the horizontal phase retardation value of the second phase compensation film 110 is larger than the decrease of the horizontal phase retardation value of the first phase compensation film 108 with the increase of the wavelength of the light, so that the slope of the relationship line L2 is negative. Preferably, the second phase compensation film 110 has positive wavelength dispersion. Also, the first phase compensation film 108 and the second phase compensation film 110 may be used to compensate the phase difference between the lights with different wavelength passing through the liquid crystal layer 118 through disposing the first slow axis 108a and the second slow axis 110a to be perpendicular to each other, so that the light leakage in the direction of the large viewing angle can be reduced.

Figure 4:
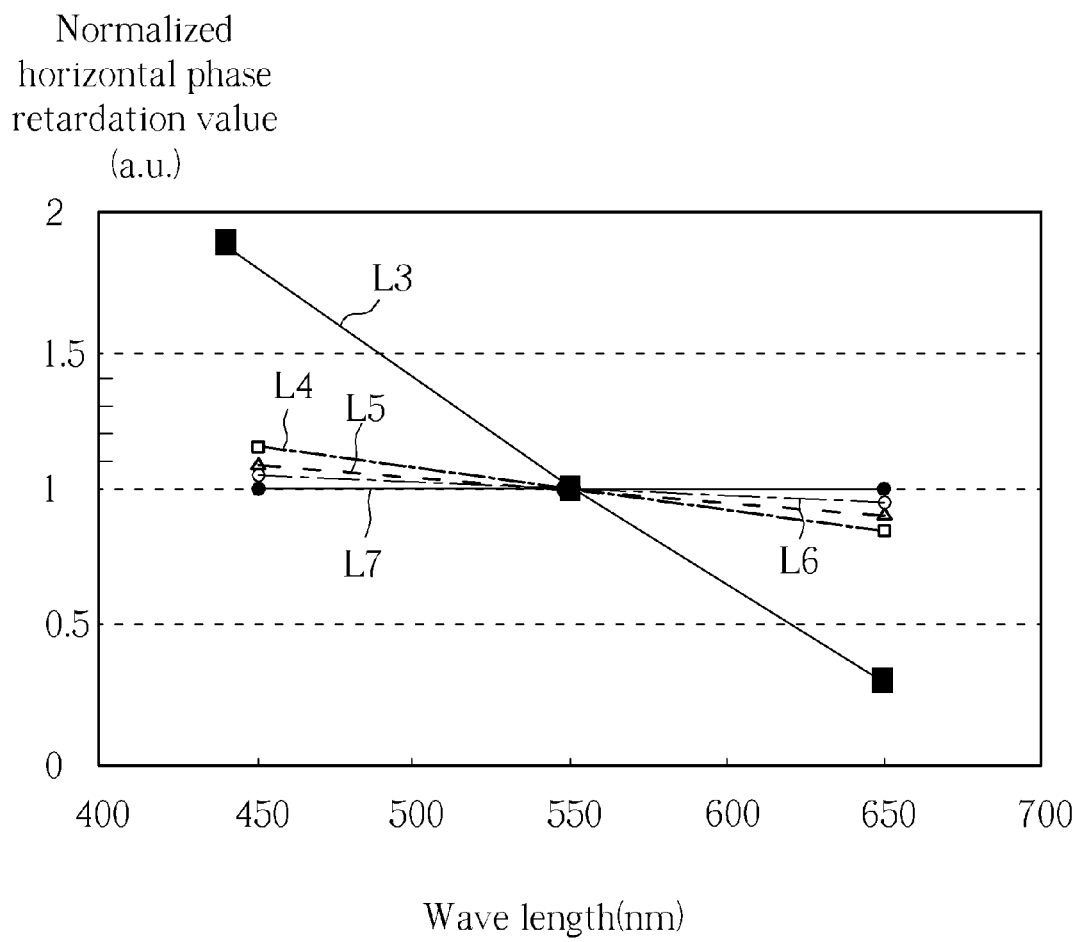
FIG. 4 is a schematic diagram illustrating a relationship between the horizontal phase retardation value of the second phase compensation film and the wavelength according to the first exemplary embodiment.
Figure 5:
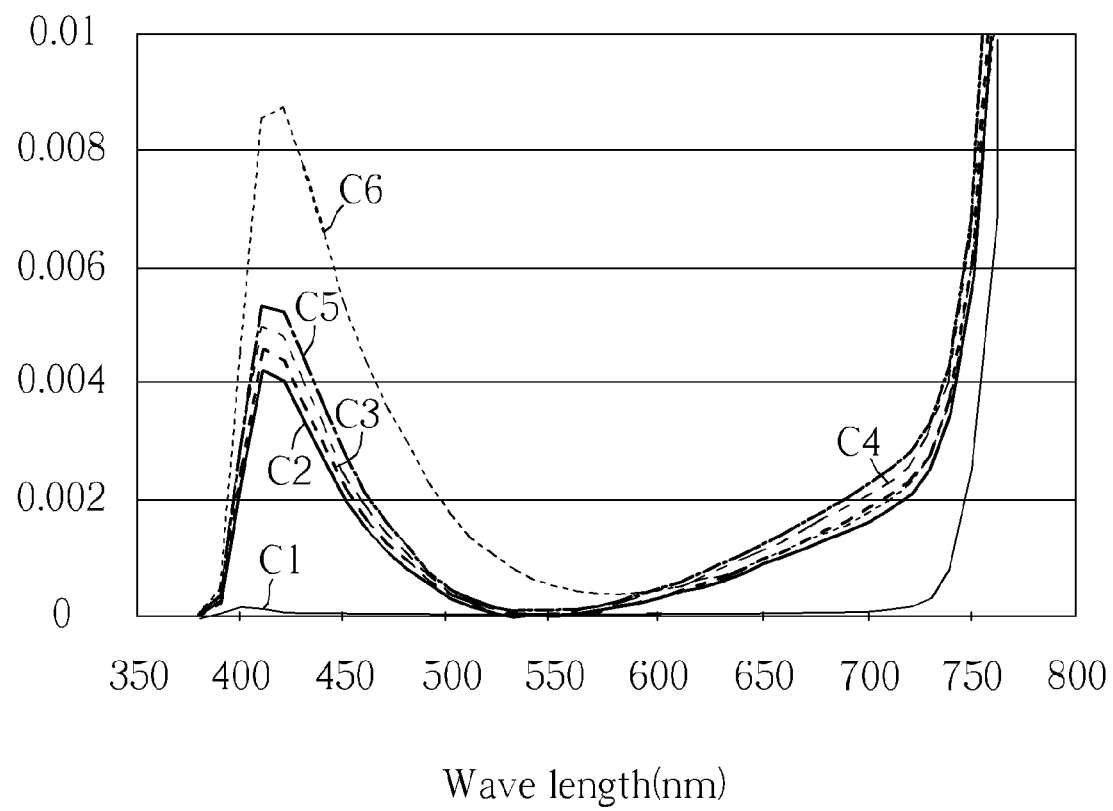
FIG. 5 is a schematic diagram illustrating a relationship between the transmittance of the display corresponding to different relationship lines in FIG. 4 and the wavelength.

In addition, the slope of the relationship line of the second phase compensation film is preferably larger in the invention. Please refer to FIG. 4 and FIG. 5. FIG. 4 is a schematic diagram illustrating a relationship between the horizontal phase retardation value of the second phase compensation film and the wavelength according to the first exemplary embodiment, and FIG. 5 is a schematic diagram illustrating a relationship between the transmittance of the display corresponding to different relationship lines in FIG. 4 and the wavelength. As shown in FIG. 4 and FIG. 5, the relationship lines L3, L4, L5, L6, and L7 represent the relationships between horizontal phase retardation values of the second phase compensation films 110 according to different examples and the wavelength. The curved lines C1, C2, C3, C4, C5 represent the relationships between the transmittances of the displays according to different examples viewed in the direction of the viewing angle θ being 60 degrees and the azimuth angle φ being 45 degrees when the displays in the dark state and the wavelength. The curved line C6 represent the relationship between the transmittance of the display without the second phase compensation film and the fourth phase compensation film and the wavelength of the light passing therethrough. The relationship line L3 corresponds to the curved line C1. The relationship line L4 corresponds to the curved line C2. The relationship line L5 corresponds to the curved line C3. The relationship line L6 corresponds to the curved line C4. The relationship line L7 corresponds to curved line C5. As we can see from these relationships, when the slopes of the relationship lines are larger, the transmittances of the display with respect to the light with short wavelength and the light with long wavelength are smaller. That is to say that when the horizontal phase retardation value of the second phase compensation film 110 is larger in shorter wavelength, the light leakage of the display 100 is lower. When the display 100 includes the second phase compensation film 110 and the fourth phase compensation film 136, the light leakage of the display 100 is less than the light leakage of the display without the second phase compensation film 110 and the fourth phase compensation film 136. In the display 100 of this embodiment, the second phase compensation film 110 and the fourth phase compensation film 136 with positive wavelength dispersion are disposed with the first phase compensation film 108 and the third phase compensation film 134, so that the phase retardation values of the lights with different wavelengths passing through the first phase compensation film 108 and the third phase compensation film 134 can be effectively compensated, and the light leakage can be reduced.

Figure 6:
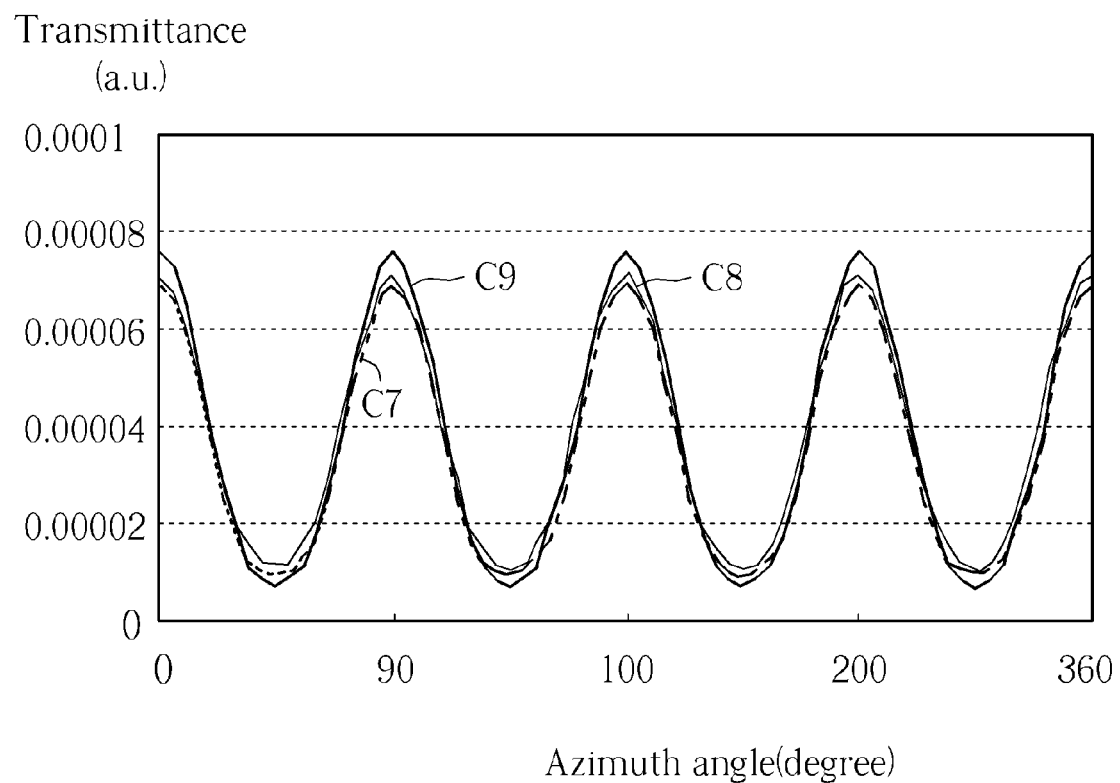
FIG. 6 is a schematic diagram illustrating the relationship between the transmittance and the azimuth angle of the display when the viewing angle is 70 degrees according to the first exemplary embodiment.

Please refer to FIG. 6, which is a schematic diagram illustrating the relationship between the transmittance and the azimuth angle of the display at the viewing angle of 70 degrees according to the first exemplary embodiment. As shown in FIG. 6, the curved line C7 represent the relationship between the transmittance and the azimuth angle when the wavelength of the light passing through the display is 440 nm. The curved line C8 represent the relationship between the transmittance and the azimuth angle when the wavelength of the light passing through the display is 550 nm. The curved line C9 represent the relationship between the transmittance and the azimuth angle when the wavelength of the light passing through the display is 650 nm. The unit of the azimuth angle is degree, and the transmittance has no unit. No matter how long the wavelength of the light is, the transmittance of the display 100 in this embodiment can be effectively reduced at the direction of the azimuth angles of 45 degrees, 135 degrees and 315 degrees, so that the light leakage of the display in the direction of different viewing angles can be reduced when the display is in dark state.

Figure 7:
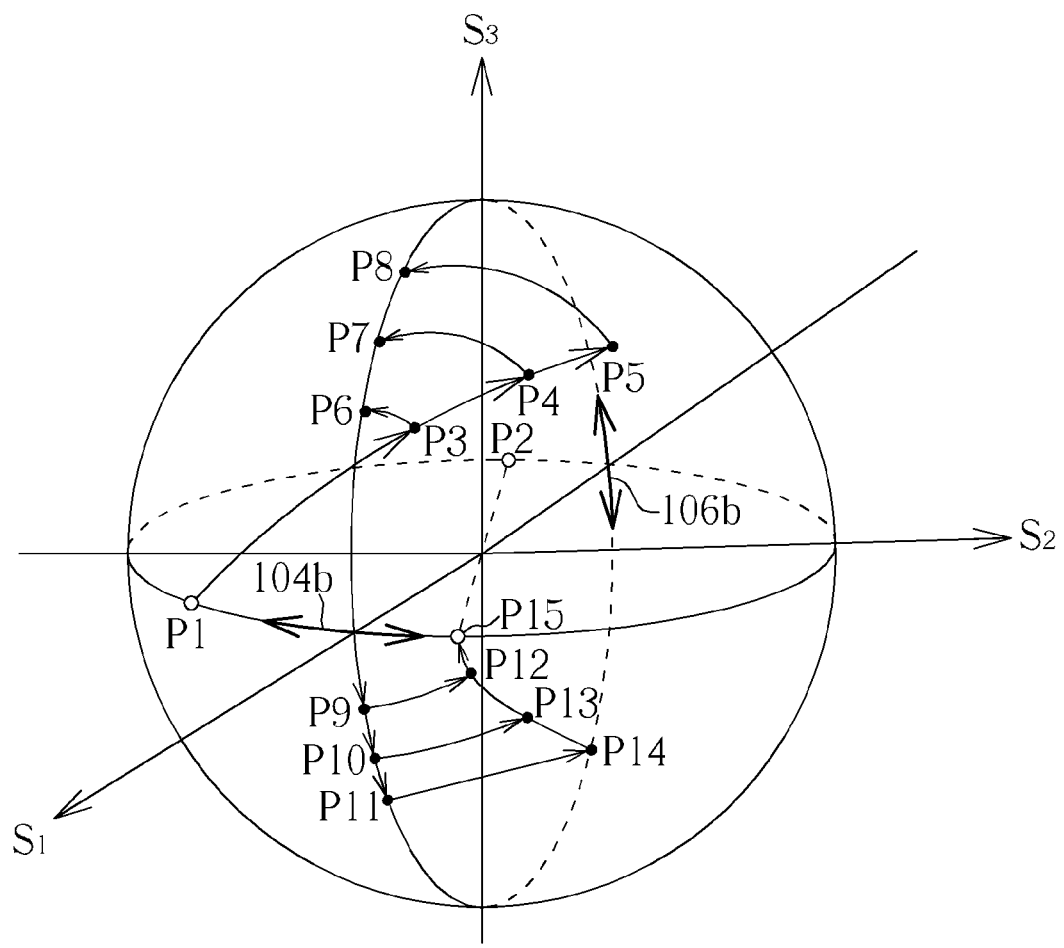
FIG. 7 is a schematic diagram illustrating the change paths of the polarizing directions of the lights with different wavelengths on the Poincare sphere when the display is in the dark state according to the first exemplary embodiment.

The method of the first phase compensation film 108, the second phase compensation film 110, the third phase compensation film 134 and the fourth phase compensation film 136 compensating the phase retardation values of the light with different wavelengths in the display 100 of this embodiment will be further mentioned in the following description. Please refer to FIG. 7 together with FIG. 1 and FIG. 2. FIG. 7 is a schematic diagram illustrating the change paths of the polarizing directions of the lights with different wavelengths on the Poincare sphere when the display is in the dark state according to the first exemplary embodiment. As shown in FIG. 1, FIG. 2 and FIG. 7, when the observer sees the display 100 in the direction of the viewing angle of 0 degree, the normal lights generated from the backlight module 112 will be transformed to be the lights having the first polarizing direction 104b that is substantially perpendicular to the second polarizing direction 106b of the second polarizer 106. When the display 100 is observed in the direction of the large viewing angle θ, such as θ>60, the first polarizing direction 104b tilts and is changed to be the polarizing direction of point P1, and the second polarizing direction 106b also tilts and is changed to be the polarizing direction of point P2. Also, an acute included angle between the polarizing direction of point P1 and the polarizing direction of point P2 is substantially smaller than 90 degrees. Then, when the light passes through the first phase compensation film 108, the polarizing directions of the lights move on the Poincare sphere and rotate with respect to the first slow axis 108a, and the moving distances are determined by the phase retardation values of the first phase compensation film 108 with respective to the wavelengths of the lights. The lights may include the lights with wavelengths λ1, λ2 and λ3, such as blue light, green light and red light, and λ1<λ2<λ3. The lights with different wavelengths take the blue light, the green light and the red light as an example in the following description, but the invention is not limited herein. When the lights with the polarizing direction of point P1 pass through the first phase compensation film 108, the polarizing direction of the blue light will move from the point P1 to the point P3; the polarizing direction of the green light will move from the point P1 to the point P4; and the polarizing direction of the red light will move from the point P1 to the point P5. Next, when the lights pass through the second phase compensation film 110, the polarizing directions of the lights move on the Poincare sphere and rotate with respect to the second slow axis 110a, and the moving distances are determined by the phase retardation values of the second phase compensation film 110 with respective to the wavelengths of the lights. Since the first slow axis 108a and the second slow axis 110a are substantially perpendicular to each other, the moving directions of the polarizing directions of the lights on the Poincare sphere are different. When the lights pass through the second phase compensation film 110, the polarizing direction of the blue light moves from the point P3 to the point P6; the polarizing direction of the green light moves from the point P4 to the point P7; and the polarizing direction of the red light moves from the point P5 to the point P8. Moreover, the liquid crystal molecules 118a also retard the phases of the lights in the direction of the large viewing angle θ, such as θ>60, so when the lights pass through the liquid crystal layer 118, the polarizing direction of the blue light will move from the point P6 to the point P9; the polarizing direction of the green light will move from the point P7 to the point P10; and the polarizing direction of the red light will move from the point P8 to the point P11. After the lights passing through the liquid crystal layer 118, the lights pass through the fourth compensation film 136, and the polarizing directions of the lights move on the Poincare sphere with respect to the fourth slow axis 136a. In this time, the polarizing direction of the blue light moves from the point P9 to the point P12; the polarizing direction of the green light moves from the point P10 to the point P13; and the polarizing direction of the red light moves from the point P11 to the point P14. Next, when the lights pass through the third phase compensation film 136, the polarizing directions of the lights move on the Poincare sphere with respect to the third slow axis 136a. Accordingly, the polarizing direction of the blue light moves from the point P12 to the point P15 or close to the point 15; the polarizing direction of the green light moves from the point P13 to the point P15. Since the point 15 and the point P2 together with the center point of the Poincare sphere are disposed in a straight line, the polarizing direction of the point P15 is perpendicular to the polarizing direction of point P2, and the lights with the polarizing direction of the point P15 does not pass through the second polarizer 106 with the polarizing direction of point P2. Accordingly, the lights in the direction of the large viewing angle θ, such as θ>60, does not pass through the display 100. Or, most of the lights in the direction of the large viewing angle θ can be absorbed by the second polarizer 106, so that the light leakage of the display 100 can be reduced or solved. Furthermore, since the distances of the lights moving on the Poincare sphere corresponds to the phase retardation values of the first phase compensation film 108, the second phase compensation film 110, the third phase compensation film 134 and the fourth phase compensation film 136, the method of compensating the phase retardation values in the direction of the large viewing angle is not limited to the above-mentioned method of the invention, and the phase retardation values of the first phase compensation film, the second phase compensation film, the third phase compensation film and the fourth phase compensation film may be adjusted to compensate the phase retardation values in the direction of the large viewing angle and to avoid light leakage accord to the actual requirements.

According to the above-mentioned description, the second phase compensation film 110 and the fourth phase compensation film 136 with positive wavelength dispersion are disposed with the first phase compensation film 108 and the third phase compensation film 134 in the display 100 of this embodiment, so that the phase retardation values of the lights with different wavelengths in the direction of the large viewing angle θ, such as θ>60, can have the same polarizing direction as the lights passing through the first phase compensation film 108, the second phase compensation film 110, the liquid crystal layer 118, the fourth phase compensation film 136 and the third phase compensation film 134, and this polarizing direction is substantially perpendicular to the linear polarizing direction of the second polarizing direction 106 viewed in the direction of the large viewing angle θ. Therefore, the light leakage of the display 100 in the direction of the large viewing angle θ can be effectively solved.

The display is not limited by the above-mentioned embodiment. The following description continues to detail the other embodiments or modifications, and in order to simplify and show the difference between the other embodiments or modifications and the above-mentioned embodiment, the same numerals denote the same components in the following description, and the same parts are not detailed redundantly.

Figure 8:
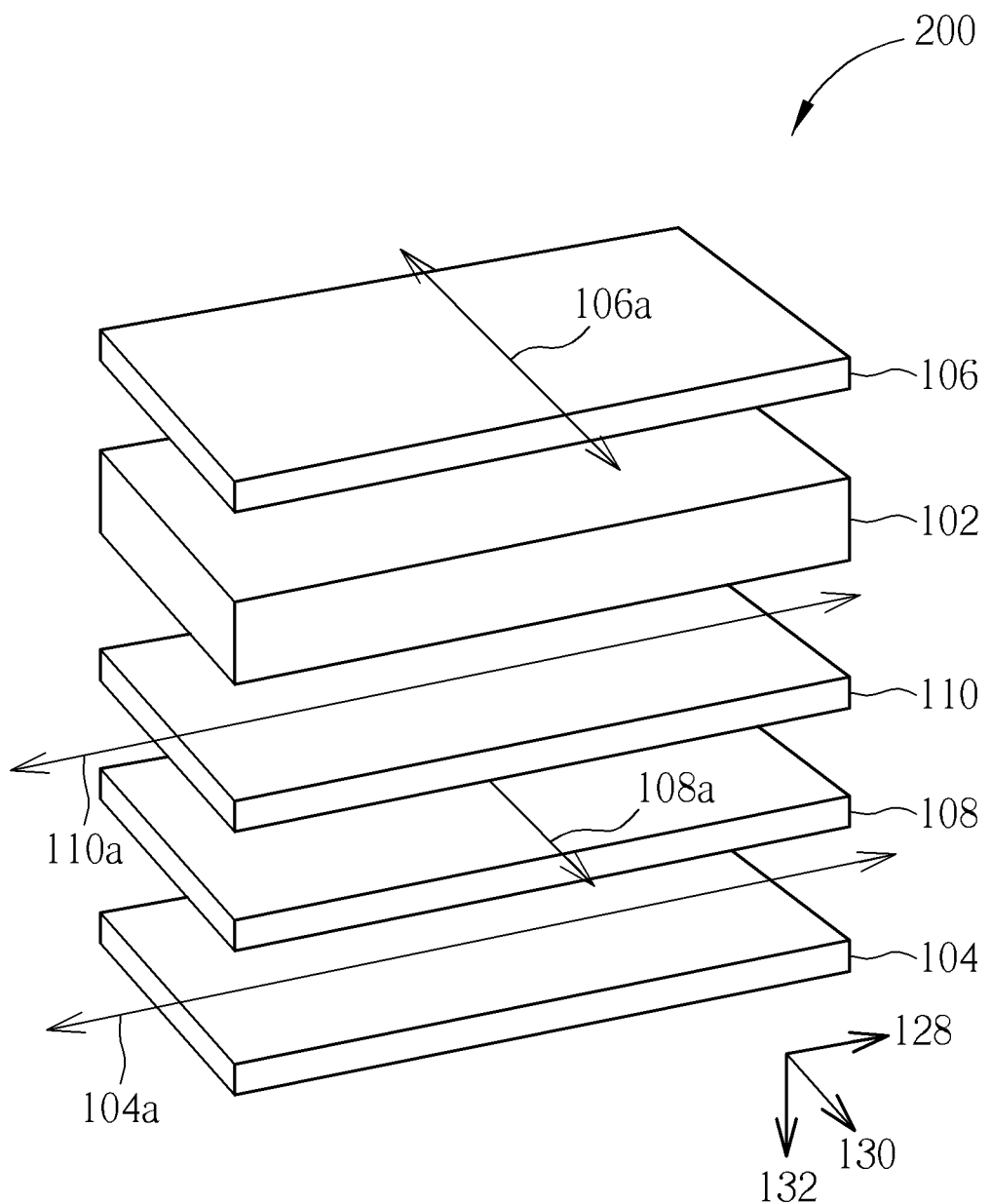
FIG. 8 is a schematic diagram illustrating a display according to a second exemplary embodiment.

Please refer FIG. 8, which is a schematic diagram illustrating a display according to a second exemplary embodiment. As shown in FIG. 8, as compared with the first embodiment, the display 200 of this embodiment doesn't include the third phase compensation film and the fourth compensation film. In other words, the display 200 of this embodiment only uses the first phase compensation film 108 and the second phase compensation film 110 to compensate the phase retardation values of the lights passing the first polarizer 104, the display panel 104 and the second polarizer 106 in the direction of the large viewing angle. In this embodiment, only the second polarizer 106 is disposed on the outer surface of the substrate 116 that is the light-emitting surface 102b in the display 200.

Figure 9:
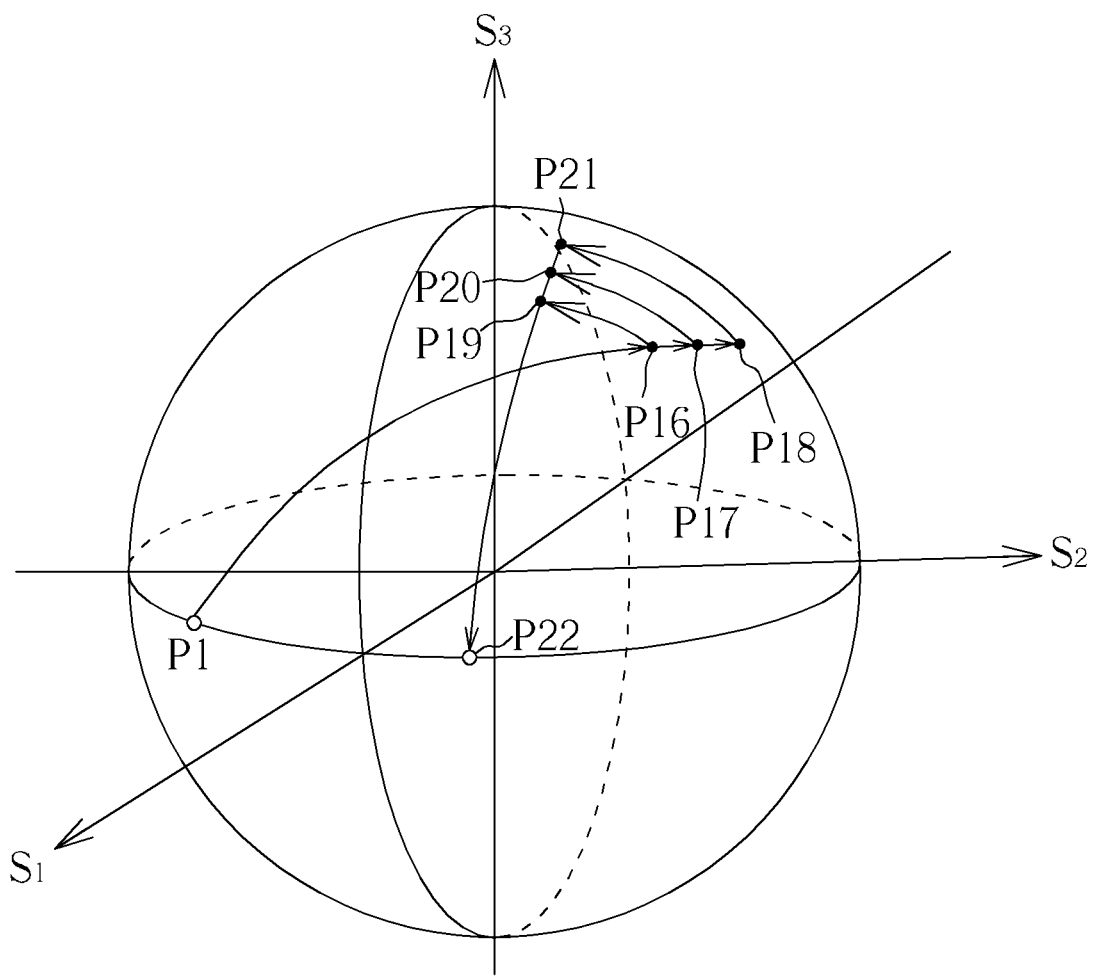
FIG. 9 is a schematic diagram illustrating the change paths of the polarizing directions of the lights with different wavelengths on the Poincare sphere when the display is in the dark state according to the second exemplary embodiment.

The method of the display 200 in this embodiment using the first phase compensation film and the second phase compensation film to compensate the phase retardation values of the lights with different wavelengths will be further mentioned in the following description. Please refer to FIG. 9 together with FIG. 8. FIG. 9 is a schematic diagram illustrating the change paths of the polarizing directions of the lights with different wavelengths on the Poincare sphere when the display is in the dark state according to the second exemplary embodiment. As shown in FIG. 8 and FIG. 9, when the lights with the polarizing direction of point P1 pass through the first phase compensation film 108, the polarizing direction of the blue light moves from the point P1 to the point P16; the polarizing direction of the green light moves from the point P1 to the point P17; and the polarizing direction of the red light moves from the point P1 to the point P18. Next, when the lights pass through the second phase compensation film 110, the polarizing direction of the blue light moves from the point P16 to the point P19; the polarizing direction of the green light moves from the point P17 to the point P20; and the polarizing direction of the red light moves from the point P18 to the point P21. Moreover, the liquid crystal molecules 118a also retard the phases of the lights in the direction of the large viewing angle θ, so when the lights pass through the liquid crystal layer 118, the polarizing direction of the blue light moves from the point P19 to the point P22; the polarizing direction of the green light moves from the point P20 to the point P22; and the polarizing direction of the red light moves from the point P21 to the point P22. Thus, the display 200 in this embodiment also can compensate the phase retardation values of the lights in the direction of the large viewing angle θ, such as θ>60, through adjusting the phase retardations of the first phase compensation film 108 and the second phase compensation film 110. Also, the third phase compensation film and the fourth phase compensation film can be omitted in the display 200 of this embodiment.

Figure 10:
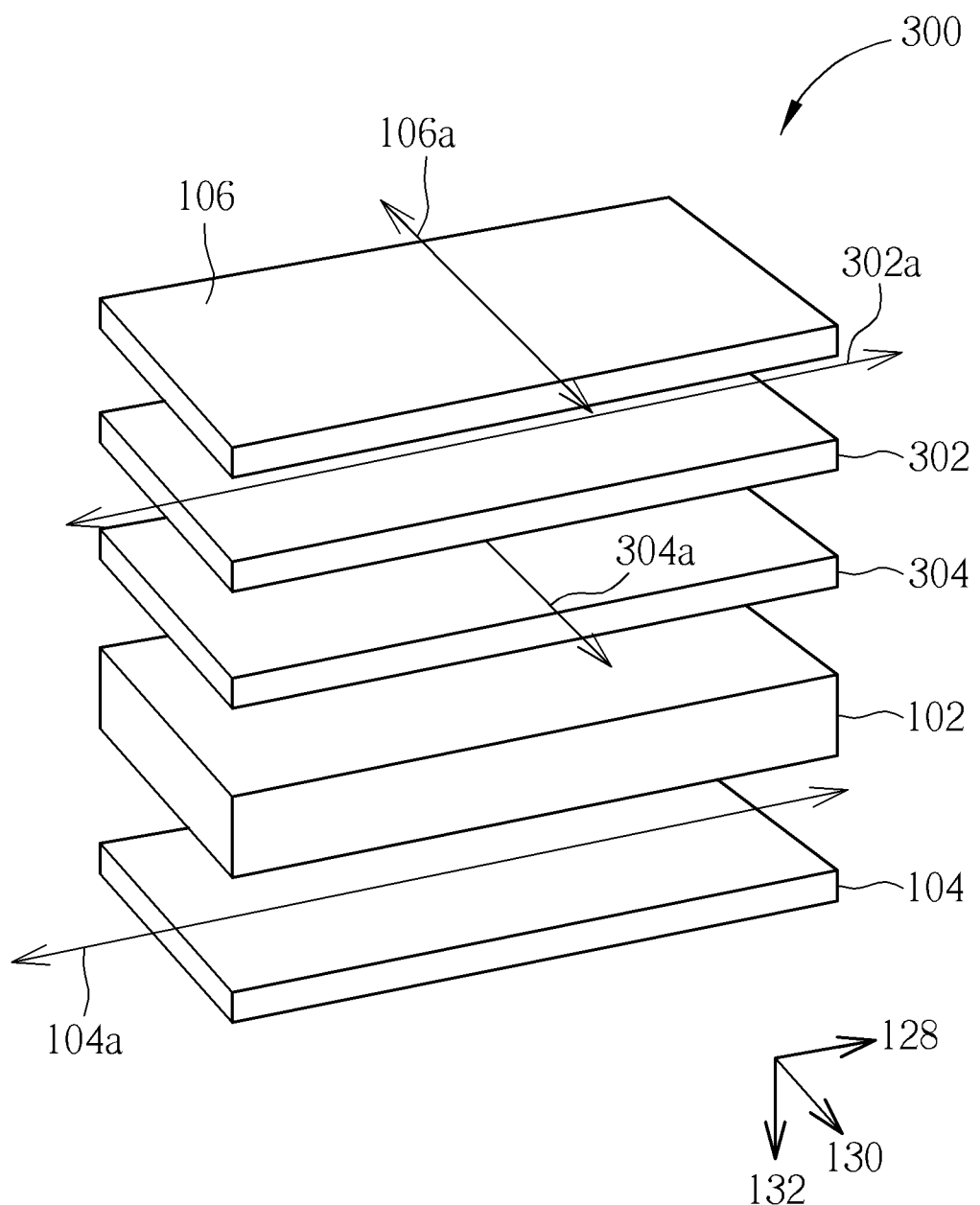
FIG. 10 is a schematic diagram illustrating a display according to a third exemplary embodiment.

Please refer FIG. 10, which is a schematic diagram illustrating a display according to a third exemplary embodiment. As shown in FIG. 10, as compared with the first embodiment, the display 300 of this embodiment doesn't include the first phase compensation film and the second compensation film in the first embodiment. In other words, the first phase compensation film 302 and the second compensation film 304 in the display 300 of this embodiment are respectively the third phase compensation film 134 and the fourth phase compensation film 136 in the first embodiment.

The first phase compensation film 302 and the second compensation film 304 are disposed between the second polarizer 106 and the display panel 102. In this embodiment, only the first polarizer 104 is disposed on the outer surface of the substrate 114 that is the light-incident surface 1022 in the display 300. The first slow axis 302a of the first phase compensation film 302 is disposed along the first direction 128, and is substantially perpendicular to the second light-absorption axis 106a. The second slow axis 304a of the second phase compensation film 304 is disposed along the second direction 130, and is substantially parallel to the second light-absorption axis 106a. The method of compensating the phase retardation values of the lights in the direction of the large viewing angle θ, such as θ>60, in this embodiment is similar to the compensating method of the third phase compensation film and the fourth phase compensation film in the first embodiment, and the difference between this embodiment and the first embodiment is that the phase retardation values of the first phase compensation film 302 and the second phase compensation film 304 in this embodiment are different from the phase retardation values of the third phase compensation film and the fourth phase compensation film in the first embodiment, so that the method of compensating the phase retardation values of the lights in this embodiment are not detailed redundantly.

Figure 11:
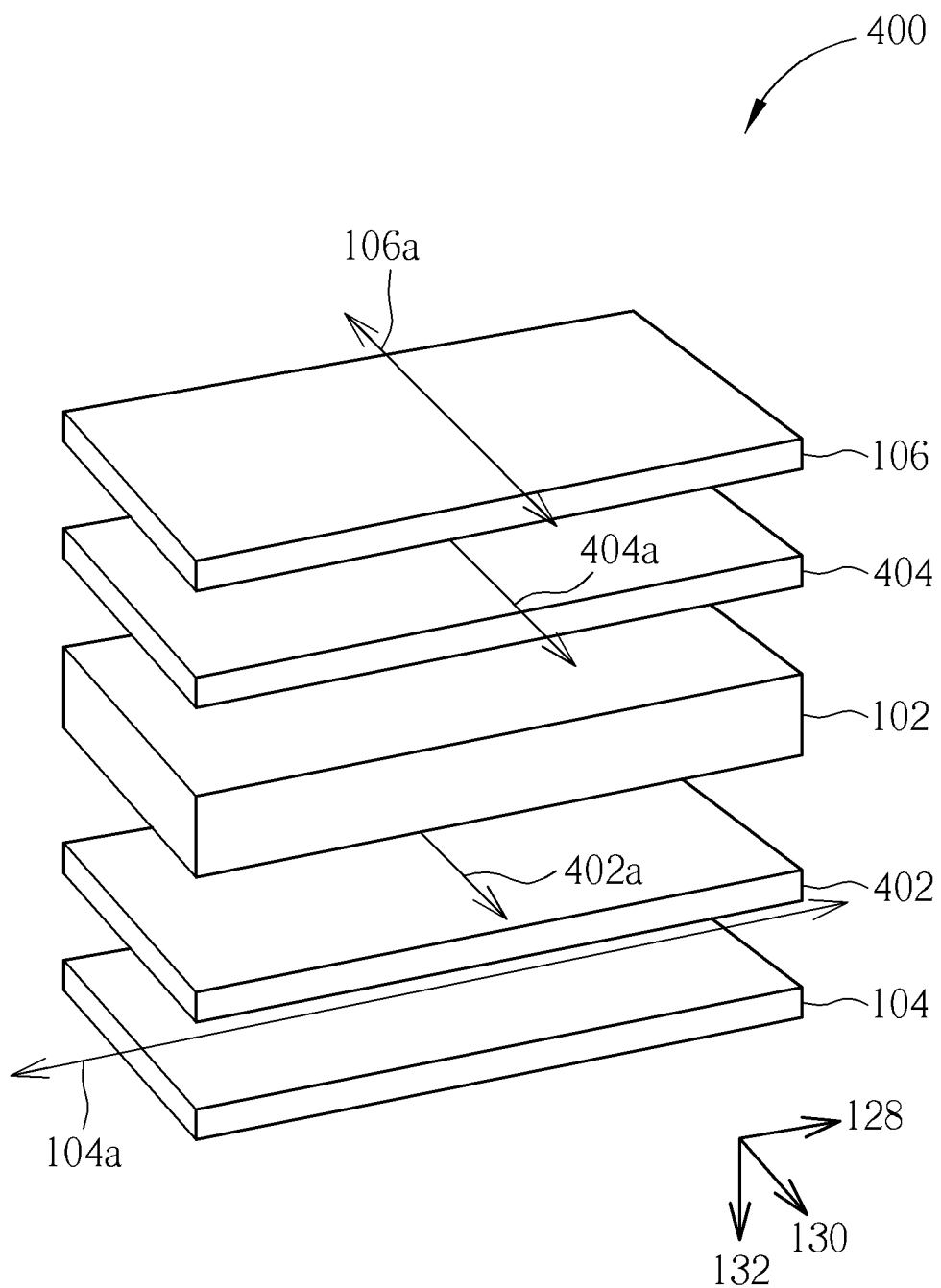
FIG. 11 is a schematic diagram illustrating a display according to a fourth exemplary embodiment.

Please refer to FIG. 11, which is a schematic diagram illustrating a display according to a fourth exemplary embodiment. As shown in FIG. 11, as compared with the first embodiment, the display 400 of this embodiment doesn't include the second phase compensation film and the third compensation film in the first embodiment. In other words, the first phase compensation film 402 and the second compensation film 404 in the display 400 of this embodiment are respectively the first phase compensation film 108 and the fourth phase compensation film 136 in the first embodiment. There is only the first phase compensation film 402 disposed between the first polarizer 104 and the display panel 102, and no other phase compensation film is disposed between the first polarizer 104 and the display panel 102. Also, there is only the second phase compensation film 404 disposed between the second polarizer 106 and the display panel 102, and no other phase compensation film is disposed between the second polarizer 106 and the display panel 102. The first slow axis 402a of the first phase compensation film 402 is disposed along the second direction 130, and is substantially perpendicular to the first light-absorption axis 104a. The second slow axis 404a of the second phase compensation film 404 is disposed along the second direction 130, and is substantially parallel to the second light-absorption axis 106a.

Figure 12:
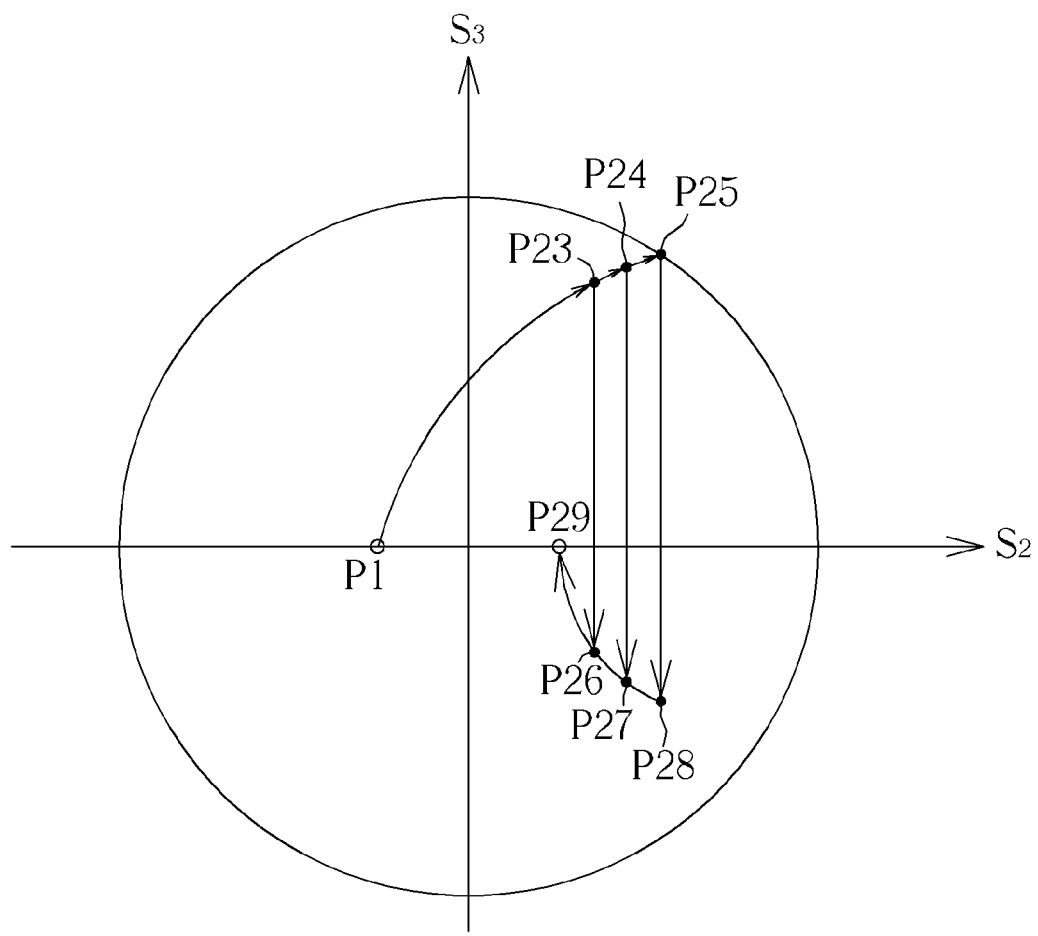
FIG. 12 is a schematic diagram illustrating the change paths of the polarizing directions of the lights with different wavelengths on the Poincare sphere when the display is in the dark state according to the fourth exemplary embodiment.

The method of the display 400 in this embodiment using the first phase compensation film 402 and the second phase compensation film 404 to compensate the phase retardation values of the lights with different wavelengths will be further mentioned in the following description. Please refer to FIG. 12 together with FIG. 11. FIG. 12 is a schematic diagram illustrating the change paths of the polarizing directions of the lights with different wavelengths on the Poincare sphere when the display 400 is in the dark state according to the fourth exemplary embodiment. As shown in FIG. 11 and FIG. 12, when the lights with the polarizing direction of point P1 pass through the first phase compensation film 402, the polarizing direction of the blue light moves from the point P1 to the point P23; the polarizing direction of the green light moves from the point P1 to the point P24; and the polarizing direction of the red light moves from the point P1 to the point P25. Next, when the lights pass through the display panel 102, the polarizing direction of the blue light moves from the point P23 to the point P26; the polarizing direction of the green light moves from the point P24 to the point P27; and the polarizing direction of the red light moves from the point P25 to the point P28. Then, when the lights pass through the second phase compensation film 404, the polarizing direction of the blue light moves from the point P26 to the point P29; the polarizing direction of the green light moves from the point P27 to the point P29; and the polarizing direction of the red light moves from the point P28 to the point P29. Thus, the display 400 in this embodiment also can compensate the phase retardation values of the lights in the direction of the large viewing angle to reduce the light leakage.

Figure 13:
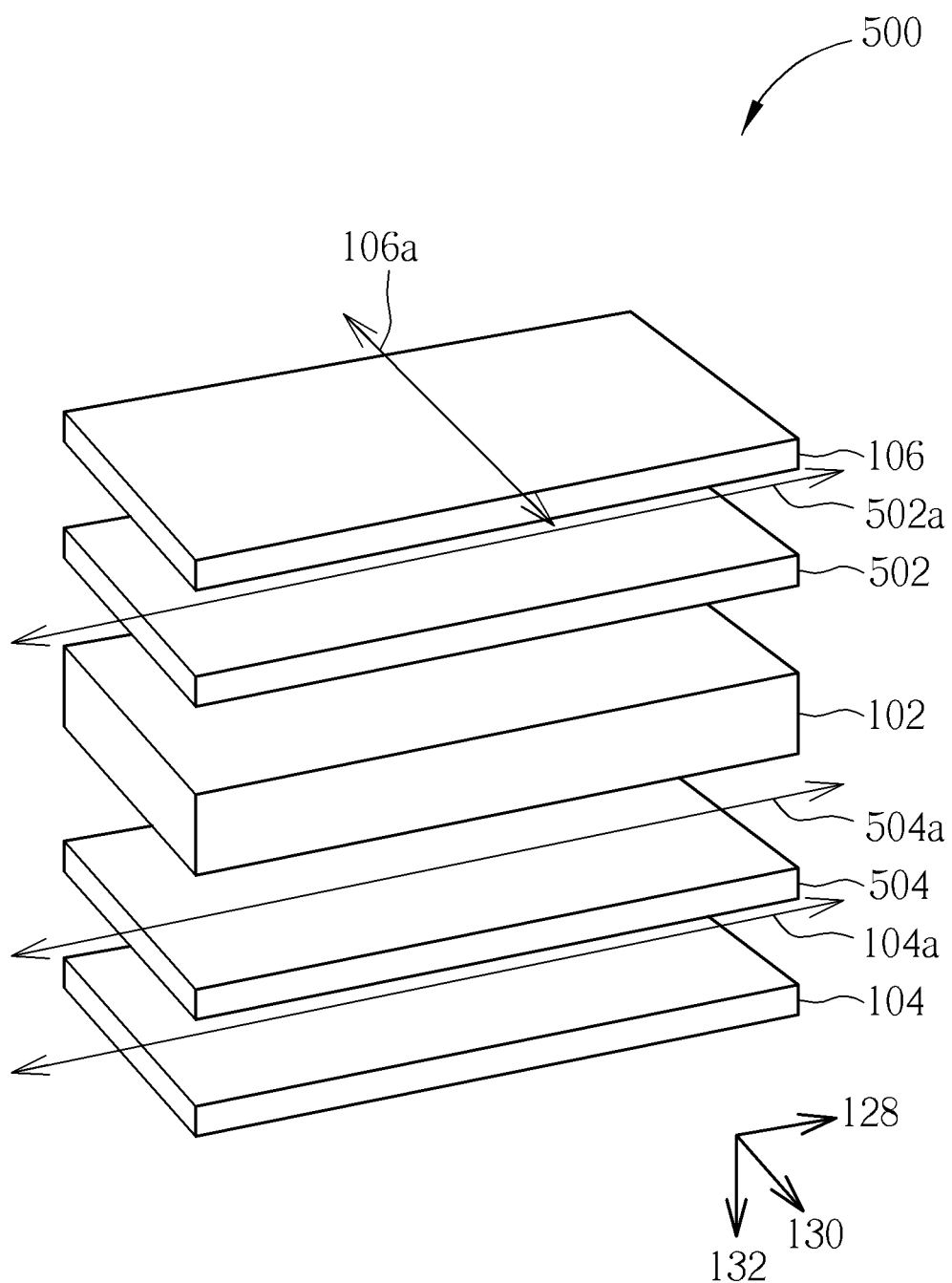
FIG. 13 is a schematic diagram illustrating a display according to a fifth exemplary embodiment.

Please refer to FIG. 13, which is a schematic diagram illustrating a display according to a fifth exemplary embodiment. As shown in FIG. 13, as compared with the first embodiment, the display 500 of this embodiment doesn't include the first phase compensation film and the fourth compensation film in the first embodiment. In other words, the first phase compensation film 502 and the second compensation film 504 in the display 500 of this embodiment are respectively the third phase compensation film 134 and the second phase compensation film 110 in the first embodiment. There is only the first phase compensation film 502 disposed between the second polarizer 106 and the display panel 102, and no other phase compensation film is disposed between the second polarizer 106 and the display panel 102. Also, there is only the second phase compensation film 504 disposed between the first polarizer 104 and the display panel 102, and no other phase compensation film is disposed between the first polarizer 104 and the display panel 102. The first slow axis 502a of the first phase compensation film 502 is disposed along the first direction 128, and is substantially perpendicular to the second light-absorption axis 106a. The second slow axis 504a of the second phase compensation film 504 is disposed along the first direction 128, and is substantially parallel to the first light-absorption axis 104a.

In summary, the display of the invention combines the second phase compensation film that obeys the first formula:

$$\frac{R\lambda 1}{\lambda 1} > \frac{R\lambda 2}{\lambda 2} > \frac{R\lambda 3}{\lambda 3}$$

with the first phase compensation film to effectively compensate the phase retardation values of the lights with different wavelengths in the direction of the large viewing angle, so that the light leakage of the display in the direction of the large viewing angle can be effectively solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device, comprising:
a display panel comprising a light-incident surface and a light-emitting surface;
a first polarizer disposed on the light-incident surface of the display panel, and the first polarizer comprising a first light-absorption axis;
a second polarizer disposed on the light-emitting surface of the display panel, and the second polarizer comprising a second light-absorption axis;

a first phase compensation film disposed between the first polarizer and the second polarizer; and
a second phase compensation film disposed between the first polarizer and the second polarizer, and the second phase compensation film obeying a first formula:

$$\frac{R\lambda 1}{\lambda 1} > \frac{R\lambda 2}{\lambda 2} > \frac{R\lambda 3}{\lambda 3},$$

wherein $R\lambda 1$, $R\lambda 2$ and $R\lambda 3$ respectively are horizontal phase retardation values of the second phase compensation film when wavelengths of lights passing through the second phase compensation film are respectively $\lambda 1$, $\lambda 2$ and $\lambda 3$, and $\lambda 1 < \lambda 2 < \lambda 3$, wherein each of the horizontal phase retardation values of the second phase compensation film is represented as $(n_x - n_y) \times d$, and wherein the second phase compensation film comprises a first slow axis and a first fast axis, $n_x$ is a refractive index of the second phase compensation film in the first slow axis, $n_y$ is a refractive index of the second phase compensation film in the first fast axis, and d is a thickness of the second phase compensation film;
wherein the first phase compensation film obeys a second formula: $R\lambda 1'/R\lambda 2' \cong 1 \cong R\lambda 3'/R\lambda 2'$, wherein $R\lambda 1'$, $R\lambda 2'$ and $R\lambda 3'$ are respectively horizontal phase retardation values of the first phase compensation film when wavelengths of lights passing through the first phase compensation film are respectively $\lambda 1$, $\lambda 2$ and $\lambda 3$, the first light-absorption axis is perpendicular to the second light-absorption axis, the first phase compensation film and the second phase compensation film are disposed between the first polarizer and the display panel, and the second phase compensation film is disposed between the first phase compensation film and the display panel, the first phase compensation film comprises a second slow axis perpendicular to the first light-absorption axis, and the first slow axis of the second phase compensation film is parallel to the first light-absorption axis.

2. The display device according to claim 1, wherein $\lambda 1$ is 440 nm, $\lambda 2$ is 550 nm, and $\lambda 3$ is 650 nm.

3. The display device according to claim 1, further comprising a third phase compensation film and a fourth phase compensation film disposed between the second polarizer and the display panel, and the fourth phase compensation film is disposed between the third phase compensation film and the display panel.

4. The display device according to claim 3, wherein the fourth phase compensation film obeys a third formula:

$$\frac{R\lambda 4}{\lambda 4} > \frac{R\lambda 5}{\lambda 5} > \frac{R\lambda 6}{\lambda 6},$$

wherein $R\lambda 4$, $R\lambda 5$ and $R\lambda 6$ are horizontal phase retardation values of the fourth phase compensation film when wavelengths of lights passing through the fourth phase compensation film are respectively $\lambda 4$, $\lambda 5$ and $\lambda 6$ and $\lambda 4 < \lambda 5 < \lambda 6$.

5. The display device according to claim 4, wherein the third phase compensation film obeys a fourth formula:

$$\frac{R\lambda 4'}{R\lambda 5'} \cong 1 \cong \frac{R\lambda 6'}{R\lambda 5'},$$

wherein $R\lambda 4'$, $R\lambda 5'$ and $R\lambda 6'$ are respectively horizontal phase retardation values of the third phase compensation film when wavelengths of lights passing through the third phase compensation film are respectively $\lambda 4$, $\lambda 5$ and $\lambda 6$.

6. The display device according to claim 5, wherein $\lambda 4$ is 440 nm, $\lambda 5$ is 550 nm, and $\lambda 6$ is 650 nm.

7. The display device according to claim 3, wherein the third phase compensation film comprises a third slow axis perpendicular to the second light-absorption axis, and the fourth phase compensation film comprises a fourth slow axis parallel to the second light-absorption axis.

8. The display device according to claim 1, wherein a refractive index of the first phase compensation film in a first direction, a refractive index of the first phase compensation film in a second direction and a refractive index of the first phase compensation film in a third direction are different, and the first direction, the second direction and the third direction are perpendicular to one another.

9. The display device according to claim 1, wherein the first phase compensation film comprises cyclo olefin polymer.

10. The display device according to claim 1, wherein a refractive index of the second phase compensation film in a first direction, a refractive index of the second phase compensation film in a second direction and a refractive index of the second phase compensation film in a third direction are different, and the first direction, the second direction and the third direction are perpendicular to one another.

* * * * *